United States Patent [19]

Nolt et al.

[11] 4,222,220
[45] Sep. 16, 1980

[54] KNOTTER MECHANISM

[75] Inventors: Edwin B. Nolt, New Holland, Pa.; Marc G. Vansteelant, Zedelgem, Belgium

[73] Assignee: Sperry Corporation, New Holland, Pa.

[21] Appl. No.: 10,205

[22] Filed: Feb. 8, 1979

[51] Int. Cl.³ .................... A01D 59/04; B65B 13/26
[52] U.S. Cl. ........................................ 56/343; 289/2; 289/11; 289/14
[58] Field of Search .............. 289/2, 3, 5, 6, 7, 8, 289/9, 10, 11, 13, 14, 16; 56/343

[56] References Cited

U.S. PATENT DOCUMENTS

| | | | |
|---|---|---|---|
| 2,349,953 | 5/1944 | Fürst | 289/3 |
| 2,723,871 | 11/1955 | Rudeen | 289/10 |
| 2,763,501 | 9/1956 | Rudeen | 289/10 |
| 2,793,890 | 5/1957 | Smith | 289/9 |
| 3,168,342 | 2/1965 | Harper | 289/2 |
| 3,254,911 | 6/1966 | Crawford | 289/13 |
| 3,309,124 | 3/1967 | Fürst | 289/3 X |
| 4,161,097 | 7/1979 | Vansteelant | 56/343 |
| 4,167,844 | 9/1979 | Freimuth | 56/343 |

FOREIGN PATENT DOCUMENTS 2826905 1/1979 Fed. Rep. of Germany ............ 56/343

OTHER PUBLICATIONS

"The New Knotter", by A. Crawford & J. L. Old, Paper No. 71-679, Chicago, Ill., Dec. 7-10, 1971, ASAE, Box 229, St. Joseph, Michigan.

Primary Examiner—Louis Rimrodt
Attorney, Agent, or Firm—Frank A. Seemar; John B. Mitchell; Ralph D'Alessandro

[57] ABSTRACT

An improved knot tying mechanism, primarily for use in the agricultural industry, is disclosed. A twine disc rotatably mounted about a central fixed hub is angularly arranged to position the twine-gripping area for better acceptance of twine from the needle and thereby reduce the incidence of misties due to inadequate gripping. A billhook shaft with a worm gear thereon extends through the fixed hub to properly support the billhook adjacent the twine-gripping area. Cooperating gear teeth on the twine disc are engaged by the worm gear so that rotational power applied to the billhook shaft is transmitted therethrough to provide corresponding movement of the twine disc.

14 Claims, 32 Drawing Figures

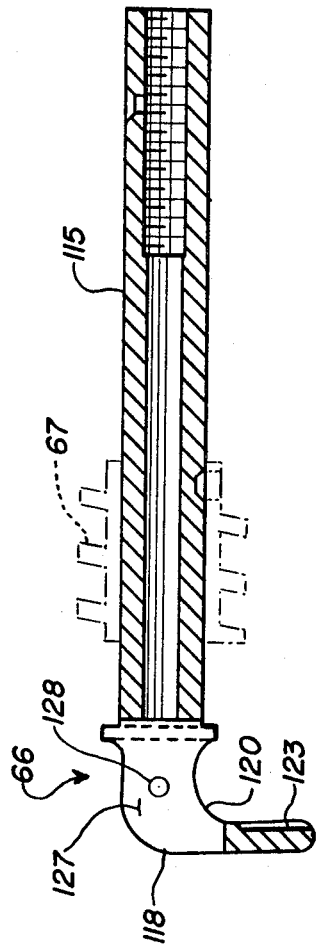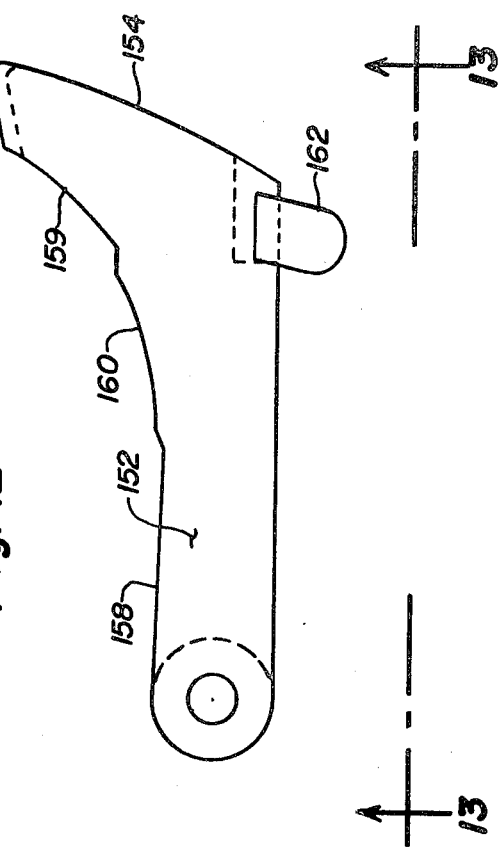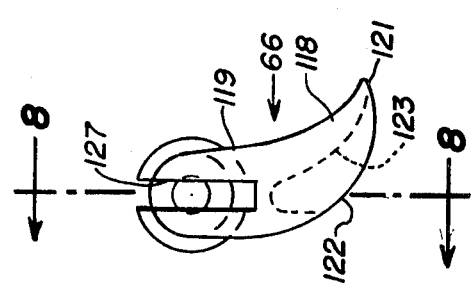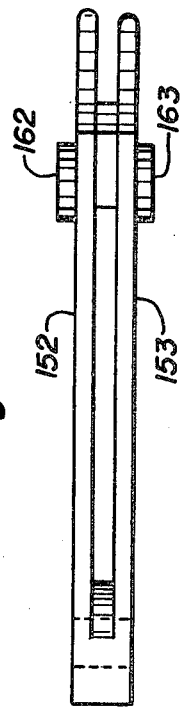

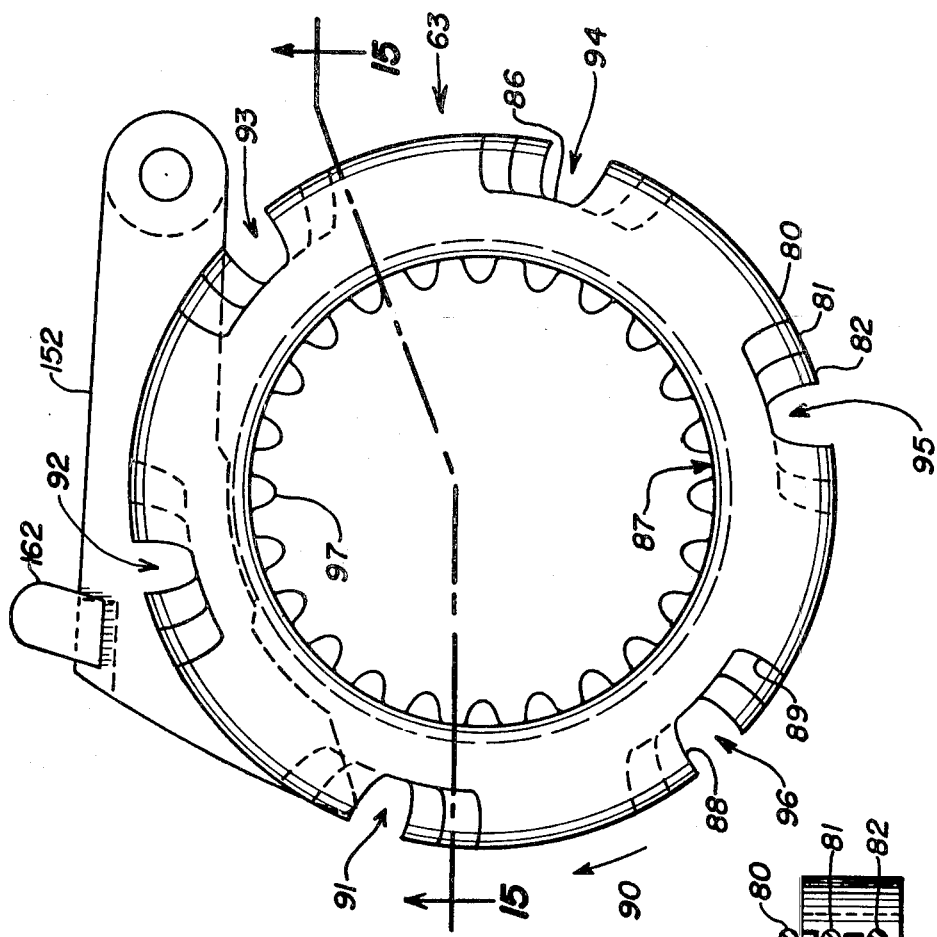
Fig. 14
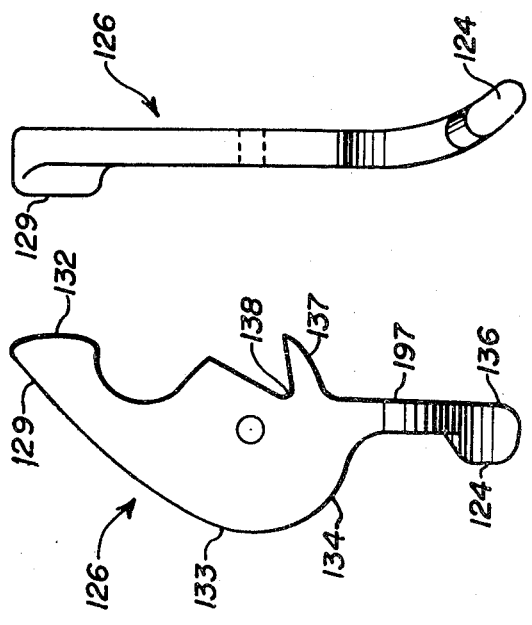
Fig. 11
Fig. 10
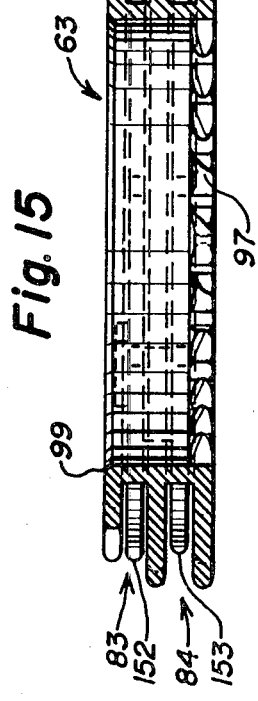
Fig. 15

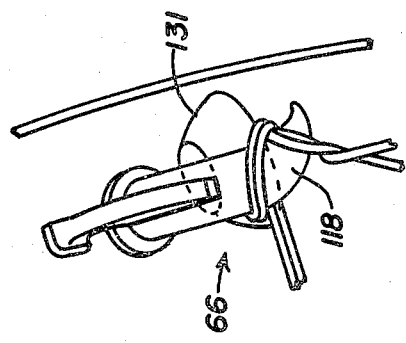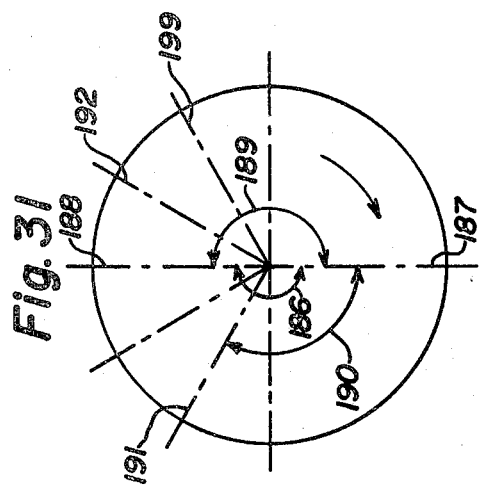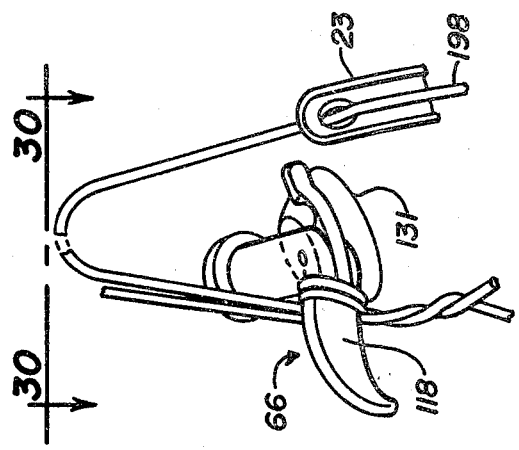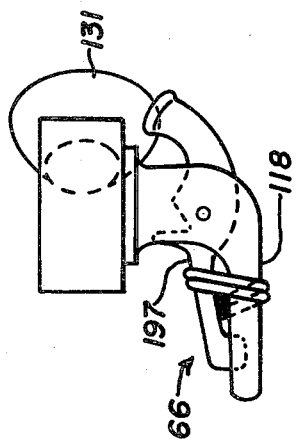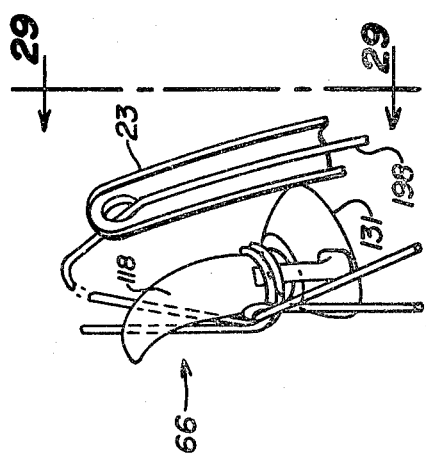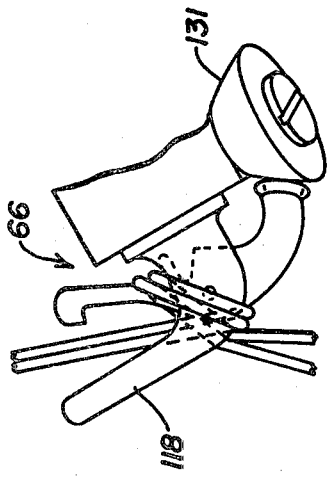

KNOTTER MECHANISM

BACKGROUND OF THE INVENTION

This invention relates generally to knot tying mechanisms, and specifically to a knotter for use in crop baling machines.

In conventional crop balers, hay, straw and similar crop material that has been previously cut, windrowed or swathed, is picked up from the ground by a pickup and fed in successive batches or charges into an elongated bale chamber in timed sequence with a reciprocating plunger. The plunger compresses the material into bales and, at the same time, gradually advances the bales toward the outlet of the bale chamber. As the bales reach a predetermined length as controlled by a metering device, a bale tying mechanism is actuated which wraps cord, twine or other flexible tying material around the bale and secures the ends of the material together.

Typically, a knotter is mounted on the bale chamber adjacent a slot therein, the knotter including a twine holder, a rotatable billhook, and various other component parts which interact to form a knot in the twine portions. During the baling operation, the leading strand of the twine is held by the twine holder and extends forwardly across a twine retainer finger and a billhook and then in front of the bale. The twine retainer finger supports the strand so that it does not bear forcefully against the billhook. A needle is involved in completing the encirclement of twine around the bale and, when advancing, the needle lays a trailing strand across the twine retainer finger, billhook and twine holder. A twine finger captures these strands of twine and positively positions the strands against the heel of the billhook. Thus, there are presented in a certain zone a pair of twine portions or strands lying alongside each other and these portions are twisted into a bight by the billhook and a portion thereof is pulled through the bight to form a double overhand knot. On completion of the operation of the knotter, the twine finger returns to the initial position. The removal of the tied knot from the billhook involves mechanical stripping by a movable member which normally embodies a knife operable to cut the twine from the twine supply so that the tied bale is complete in itself. The tying mechanism thus includes several components working in a precisely timed relationship so that theoretically the mechanism ties one knot for each bale and prepares the twine for the succeeding bale.

Those of skill in the art will generally agree that the knotter is one of the most complex components of a baler, and, therefore, one of the most difficult to understand and maintain. A great deal of research and experimentation has been, and still is on a continuing basis, undertaken by individuals and corporations in an effort to improve knotters and reduce their sensitivity. Examples of these efforts abound in the prior art. Recently, a novel knotter has been developed which exhibits exceptional structural simplicity and highly reliable operational characteristics. This new knotter is disclosed in co-pending patent application Ser. No. 916,313. The instant application is directed to improvements in the above-identified knot tying mechanism which substantially advance its performance characteristics.

In particular, the knotter disclosed in the application Ser. No. 916,313 includes a planar twine disc declined relative to the twine being presented to the twine-gripping area of the disc by the needle. This angle of twine presentation contributed to an incidence of mistie which, though acceptable, was not within a preferable range.

SUMMARY OF THE INVENTION

It is an object of the instant invention to provide a knotter having an improved twine disc attitude relative to the twine being presented to the twine-gripping area by a baler needle.

It is another object of the instant invention to provide a knotter with a twine disc rotatable about a central fixed hub with a billhook shaft extending through the fixed hub, the disc having gear teeth thereon and the shaft having a worm gear thereon operably engaged with the gear teeth so that rotation of said billhook shaft causes a corresponding rotation of said twine disc.

It is another object of the instant invention to provide a knot tying mechanism which is more compact than that heretofore known.

It is a further object of the instant invention to provide a knot tying mechanism which is less susceptible to malfunction due to crop particle accumulation.

It is a still further object of the instant invention to provide a knot tying mechanism wherein the billhook shaft extends through the fixed hub of a rotatable twine disc at an angle relative to the plane of the twine disc.

It is an even still further object of the instant invention to provide a knot tying mechanism for a crop baler which has improved operational characteristics due to the positional relationship between the twine holding area of the twine disc and the billhook.

These and other objects are attained according to the instant invention by providing a knot tying mechanism with improved operational characteristics. A twine disc rotatably mounted about a central fixed hub is angularly arranged to position the twine-gripping area for better acceptance of twine from the needle and thereby reduce the incidence of misties due to inadequate gripping. A billhook shaft with a worm gear thereon extends through the fixed hub to properly support the billhook adjacent the twine-gripping area. Cooperating gear teeth on the twine disc are engaged by the worm gear so that rotational power applied to the billhook shaft is transmitted therethrough to provide corresponding movement of the twine disc.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 8 is a cross sectional view of the billhook and shaft taken along lines 8—8 of FIG. 9;

FIG. 9 is a bottom axial view of the billhook;

FIG. 10 is a side elevational view of the movable jaw of the billhook;

FIG. 11 is a plan view of the movable jaw of the billhook;

FIG. 12 is a top plan view of the twine retainer fingers of the knotter mechanisms;

FIG. 13 is a side elevational view of the twine retainer fingers of FIG. 12, taken along lines 13—13;

FIG. 14 is a top plan view of the twine disc and twine retainer fingers of the knotter of the instant invention;

FIG. 15 is a sectional view of the twine disc and twine retainer fingers taken along lines 15—15 of FIG. 14;

FIGS. 20 through 30 schematically illustrate the billhook as it progresses through the successive angular operating positions in the formation of a knot (i.e. at 0 degrees, 90 degrees, 180 degrees, 270 degrees, 360 degrees, 450 degrees, 540 degrees, 630 degrees and 720 degrees, respectively);

FIG. 31 is a diagram illustrating the knotter drive; and

DESCRIPTION OF THE PREFERRED EMBODIMENT

Figure 1:
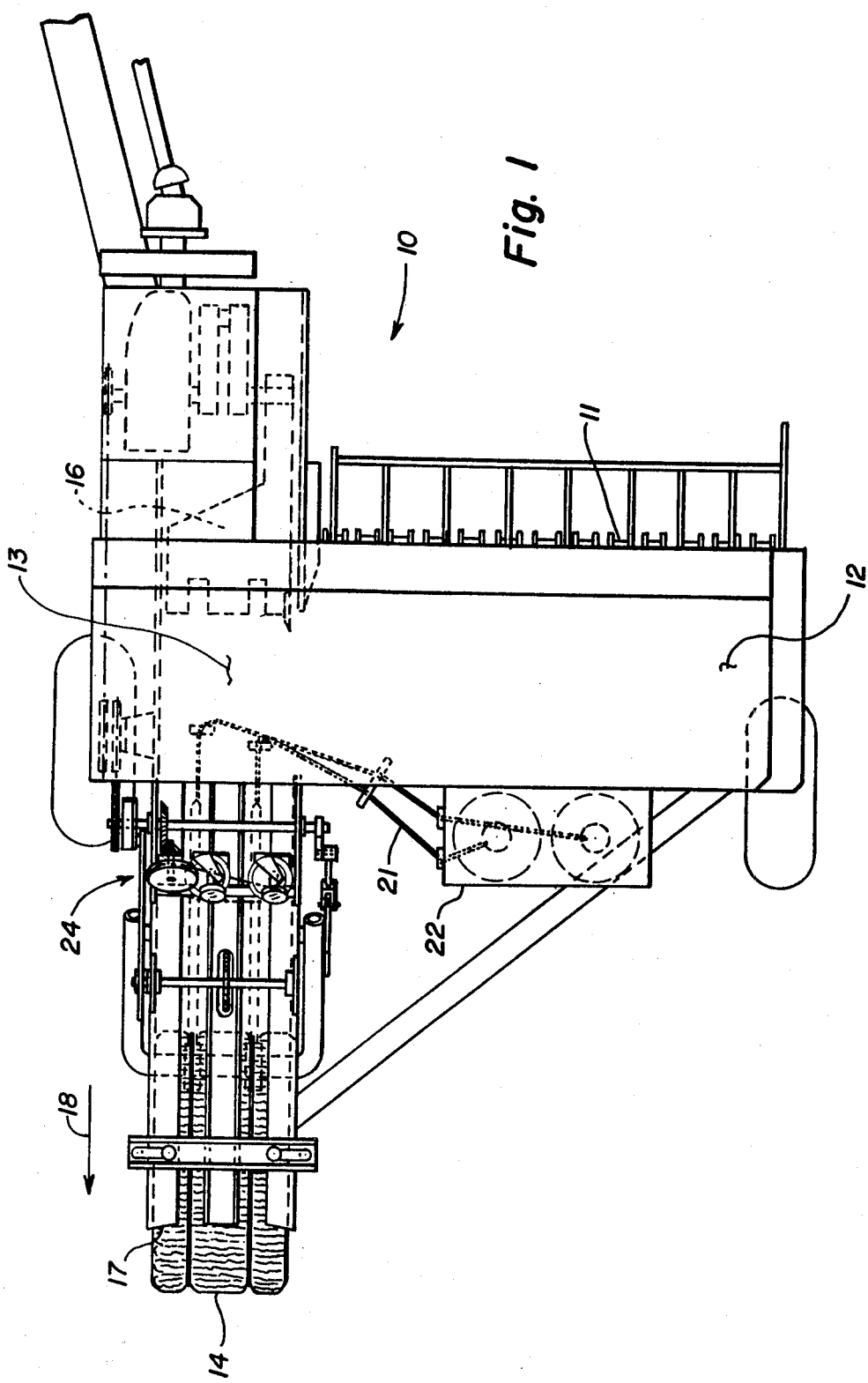
FIG. 1 is a schematic top plan view of a crop baler equipped with a pair of knotters according to the instant invention.
Figure 2:
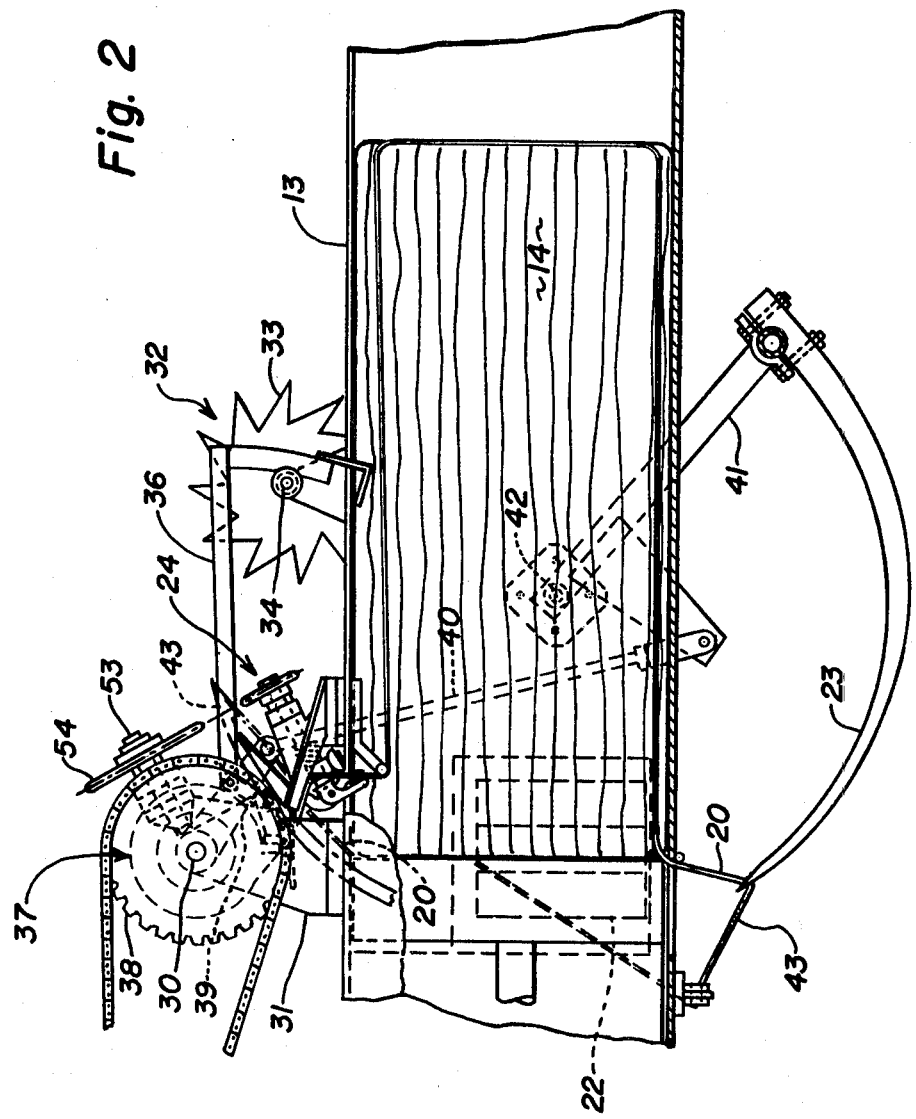
FIG. 2 is a schematic sectional view of the bale chamber and associated parts of the baler of FIG. 1.

A typical agricultural baler, generally designated 10, is shown in FIGS. 1 and 2 to include a wheel supported chassis upon which are mounted a pickup mechanism 11, a feeder mechanism 12 and a bale chamber 13. As cut crop material is picked up from the ground, it is fed in successive batches or charges into the inlet of the bale chamber 13 and the batches of material are compressed into bales 14 by a reciprocating plunger 16 which also advances the bales along the chamber 13 toward an outlet 17 in the direction of arrow 18.

Figure 7:
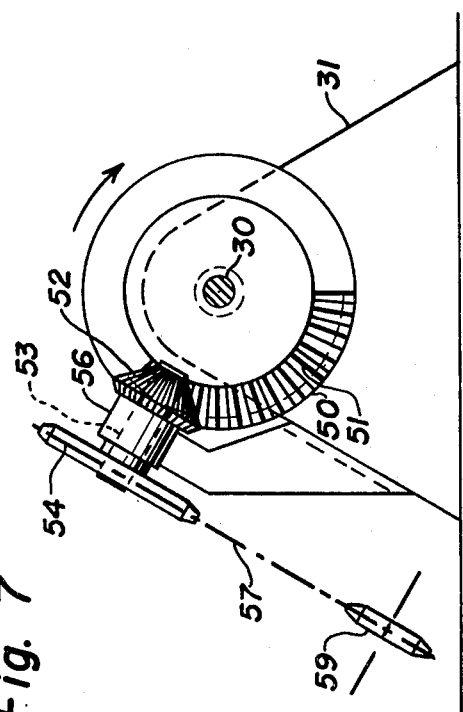
FIG. 7 is a schematic sectional view of the drive means of FIG. 6, taken along lines 7—7.
Figure 6:
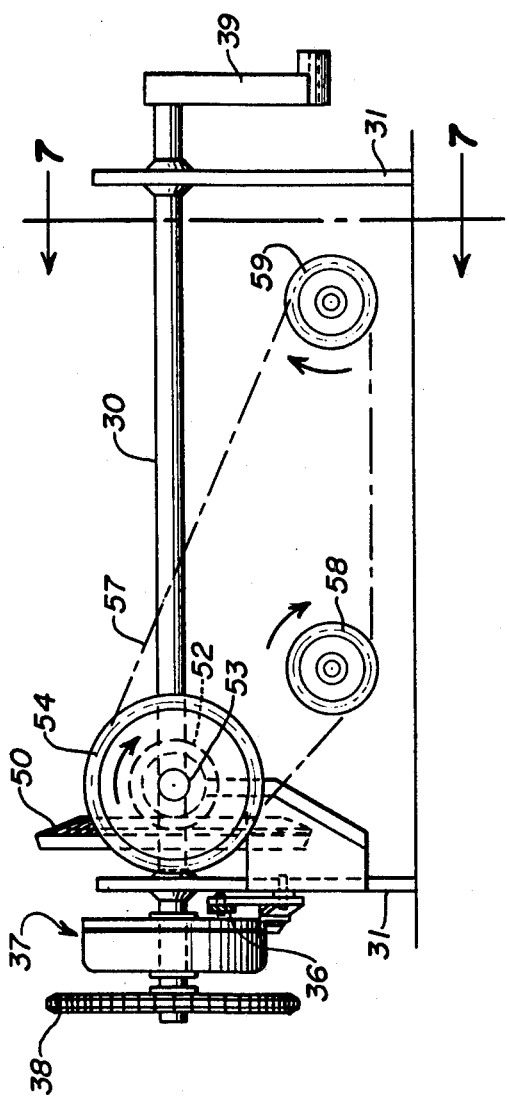
FIG. 6 is a schematic view of the drive means for the pair of knotters shown in FIG. 1.

As can perhaps best be seen in FIG. 2, a primary portion or length 20 of twine or flexible material 21 extends across a bale chamber 13 in the path of the leading end of each bale 14 from a supply reel or container 22 and passes through the eye of a needle 23 with the primary portion 20 of the twine 21 being held in a knotter 24 mounted on a top wall of the bale chamber 13. The baler carries a pair of identical knotters 24 and each knotter is arranged to cooperate with a needle 23 whereby a pair of needles also has to be provided. A main drive shaft 30 (FIGS. 2, 6 and 7) is rotatably journalled in support 31 on the upper wall of the bale chamber 13 at a distance thereabove and transversely of the baling chamber 13. This main drive shaft 30 is intermittently actuated by a conventional trip mechanism 32 which includes a starwheel 33 arranged to engage the bale of hay or other material as it is being formed, whereby it is rotated about a shaft 34 as the bale 14 moves along chamber 13. The shaft 34 is operatively coupled to a trip lever 36 which itself is connected to a clutch mechanism 37 mounted on the main shaft 30. One half of the clutch mechanism 37 is driven continuously through a chain or sprocket drive transmission from an intermediate shaft on the baler, only a sprocket 38 thereof being shown in FIGS. 2 and 6. The diameter of the starwheel 33 and the transmission ratio between the shaft 34 and the trip lever 36 are such as to allow the formation of a bale of predetermined length before the trip mechanism actuates the clutch mechanism 37, whereupon the main shaft 30 is driven to initiate the tying of a knot by each knotter. The main shaft 30 has a crank arm 39 attached thereto at its end opposite to the clutch mechanism 37, the arm 39 being connected by a pitman or link 40 to a needle frame 41 which carries the pair of needles 23 (FIG. 2). The needle frame 41 is pivotally mounted on the bale chamber 13 by bearings 42. The bale chamber 13 has a pair of longitudinal slots in its lower wall for accommodating the needles 23 when pivoted to their full throw position.

No further elaboration will be given concerning the structural details of the trip mechanism 32 and the needle frame and drive mechanism as these details are sufficiently well known in the art. Operatively, upon actuation of the clutch mechanism 37, the main shaft 30 is driven, and the needles 23 move from the rest position (indicated by full lines in FIG. 2) to their full throw position (shown partially in phantom lines in FIG. 2) to wrap the respective lines 21 around the bottom and trailing end of the bale 14 and place the secondary portions 43 of the twines 21 in the respective knotters 24. Each twine 21 loops back over the needle 23 to the reel 22 in the full throw position, thereby leaving a new primary portion or length of twine 21 across the path of the next bale to be formed. As each needle 23 returns to its rest position, the ends of each primary and secondary portion, 20 and 43, are twisted and tied together by the knotter 24, with a secondary portion 43 being severed during the tying operation. The entire knotting or tying operation takes place between successive strokes of the baler plunger 16.

The main shaft 30 also has attached thereto a single conical gear segment 50 having teeth 51 over only about ⅓ of its circumference. The gear teeth 51 are arranged to mesh with the teeth of a conical gear 52 which is mounted on one end of a stub shaft 53 on the other end of which is mounted a sprocket 54. The shaft 53 is journalled in a support 56. A chain 57 engages the sprocket 54 and sprockets 58 and 59 of the respective knotters 24.

As already stated, the two knotters 24 are identical and, therefore, only one will be described in further detail in relation to the associated needle 23 and other components.

Figure 3:
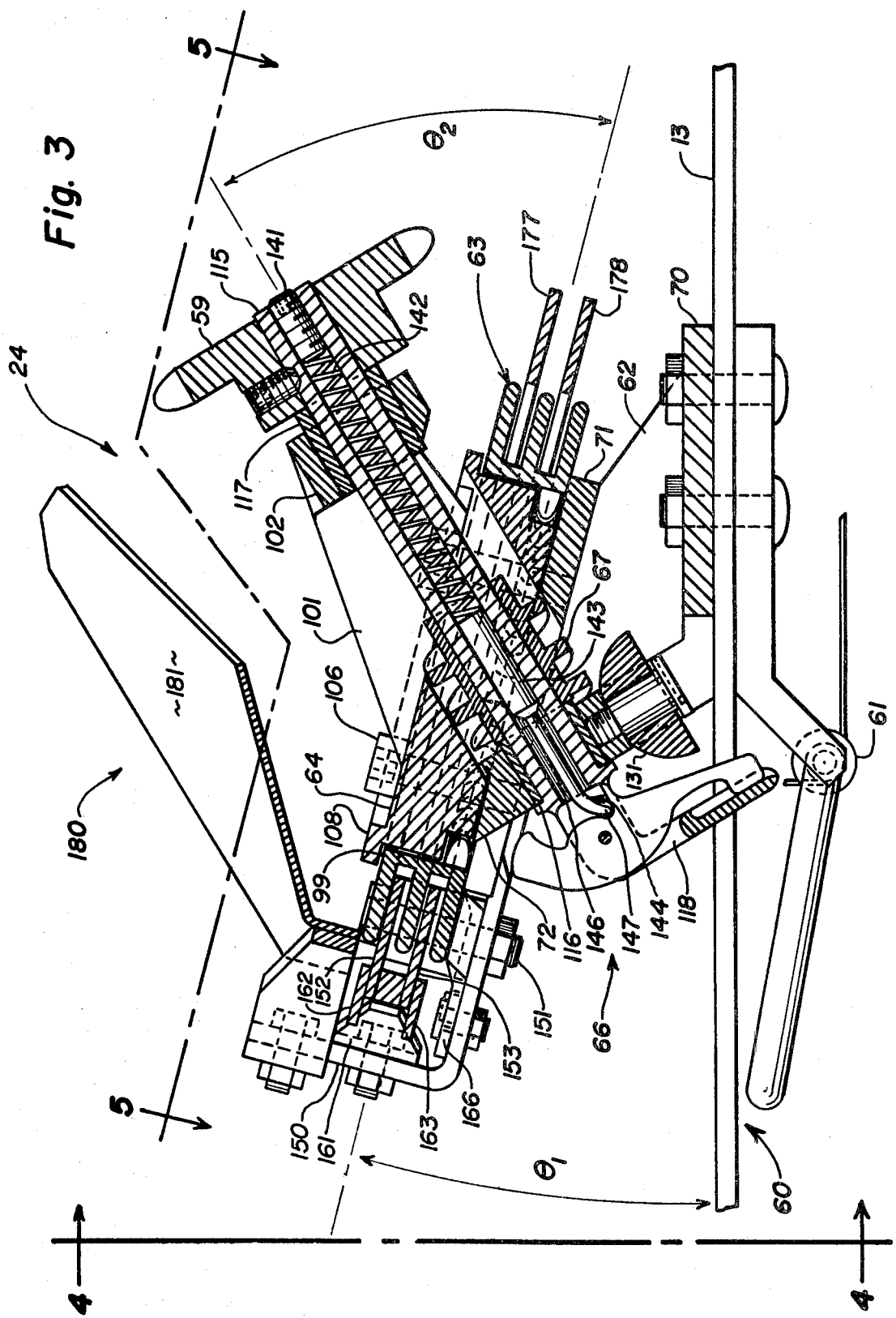
FIG. 3 is a schematic sectional view of one knotter according to the instant invention.

By way of general introduction to the knotter structure, attention is directed to the cross sectional view of FIG. 3 where the basic component parts, and their interrelationships can be seen. Each knotter 24 is mounted to the top wall of the bale case 13 adjacent an elongate aperture 60 slightly rearwardly of twine guide rollers 61 (see FIGS. 3 and 4). The knotter includes a base or a support frame 62, a generally circular twine disc 63 rotatably mounted by a central hub 64 fixed to support frame 62, a billhook 66 including elongate shaft 115 extending angularly through, and rotatably supported by, hub 64, and a worm gear 67 fixed to the billhook shaft in meshing engagement with the internal gear teeth 97 on twine disc 63. As mentioned above, and clearly seen in FIG. 3, for example, the twine disc 63 is maintained at an angle $\theta_1$ relative to the bale case 13. Though further discussion will be given below, it should be appreciated at this time that $\theta_1$ is an acute angle and allows for a better placement of the twine in the twine-gripping area of the twine disc by the needle 23. Also, as can be seen in FIG. 3, the billhook shaft 115 is positioned at angle $\theta_2$ relative to the twine disc 63. The angular relationship between the shaft 115 and the twine disc permits the billhook 66 to be situated properly for the knot tying operation. Following is a more detailed description of the structural configuration of the knotter 24 and the important interrelationships among the parts.

Figure 16:
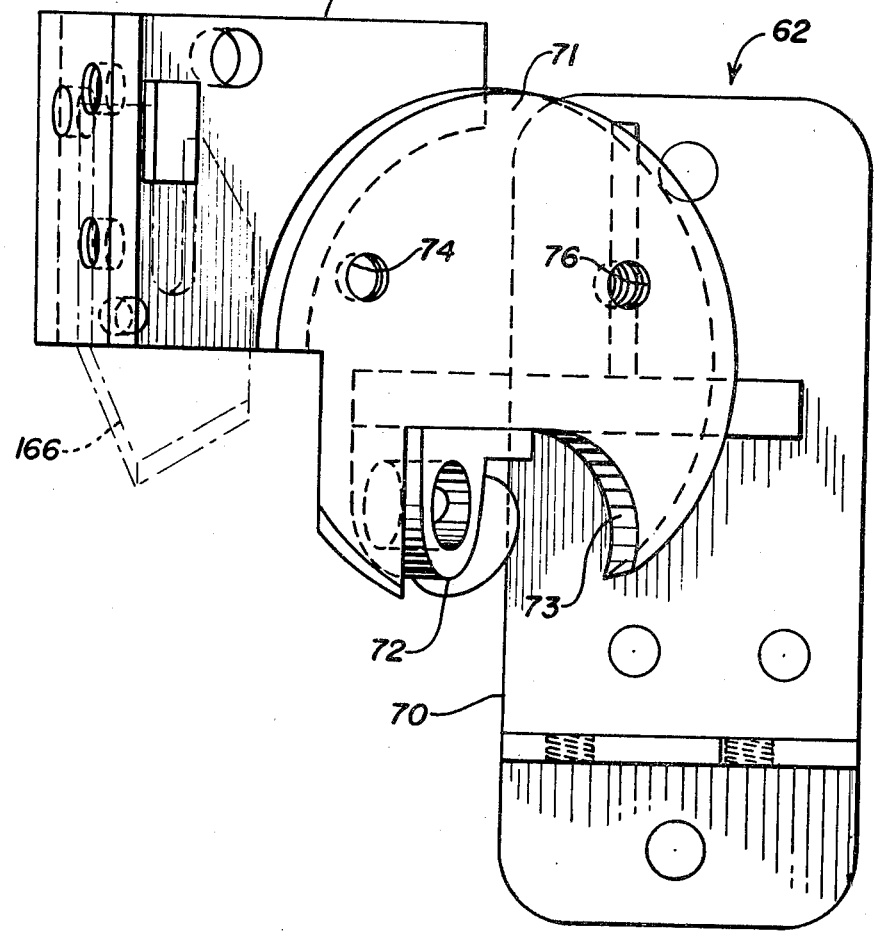
FIG. 16 is a top plan view of the support frame of the knotter.
Figure 17:
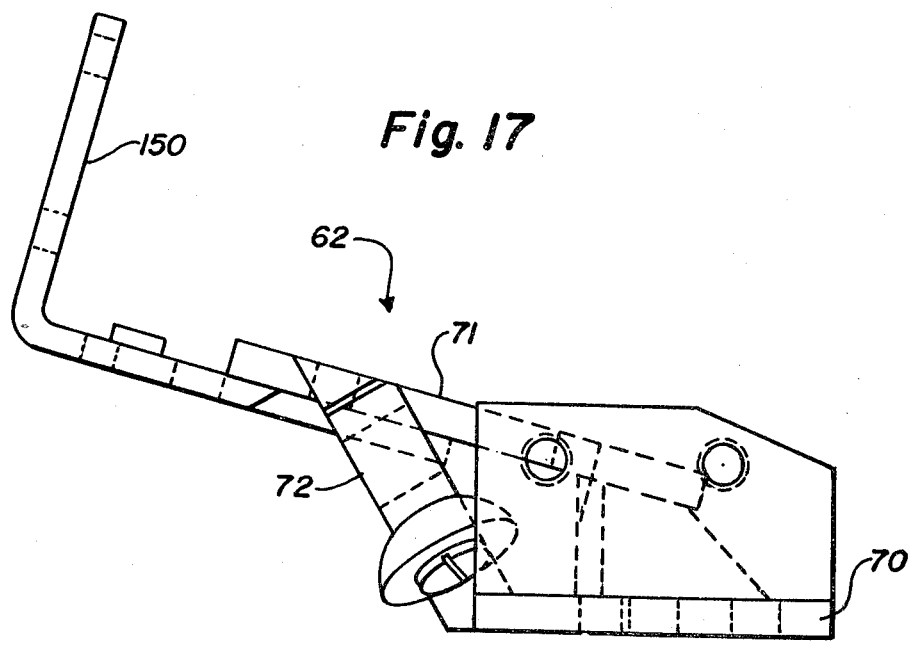
FIG. 17 is a side elevational view of the support frame of FIG. 16.

The support frame 62 (generally seen in FIGS. 3, 4 and 5, and more specifically in FIGS. 16, 17 and 18) includes a generally horizontal bottom plate 70 which is adapted to be removably affixed to the top wall of bale chamber 13. A twine disc support plate 71 is attached to bottom plate 70 at an angle relative to the plant thereof equal to angle $\theta_1$. A cylindrical bearing sleeve 72 is also supported by the bottom plate 70, adjacent support plate 71. As can be seen best in FIG. 16, support plate 71 has a recess 73 cut therein adjacent bearing sleeve 72 to provide operational clearance for the worm gear 67. A plurality of apertures are provided in the bottom plate 70 (not numbered) for the convenient attachment thereof to the bale case 13. Also, as can be perhaps best seen in FIG. 16, threaded apertures 74 and 76 are provided in the support plate 71 for the attachment of hub 64. It should be readily realized by one of skill in the art that the support frame 62 may be constructed of individual elements, or cast as a single unitary structure, or any combination thereof.

Figure 4:
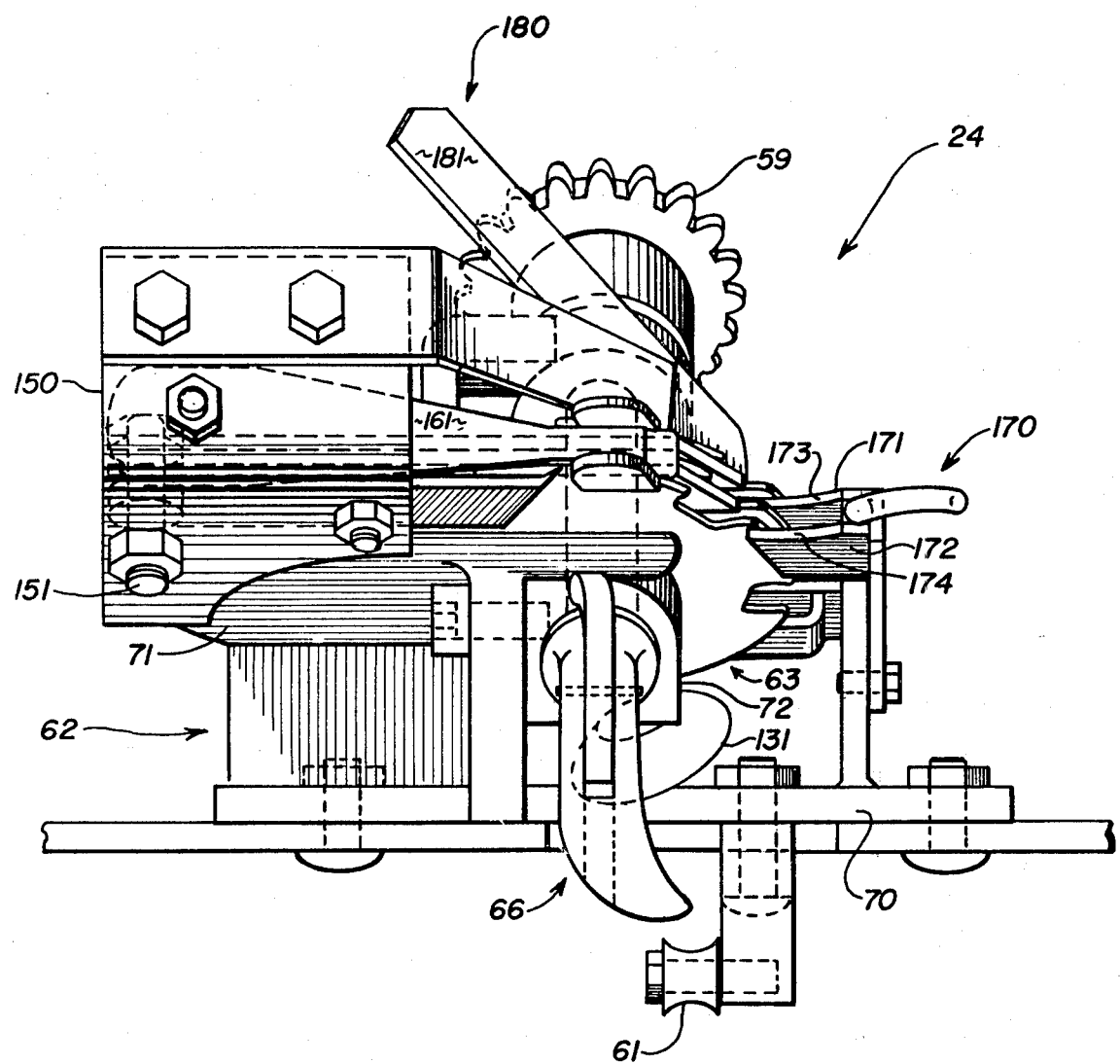
FIG. 4 is a plan view of the knotter of FIG. 3 taken along lines 4—4 thereof.
Figure 5:
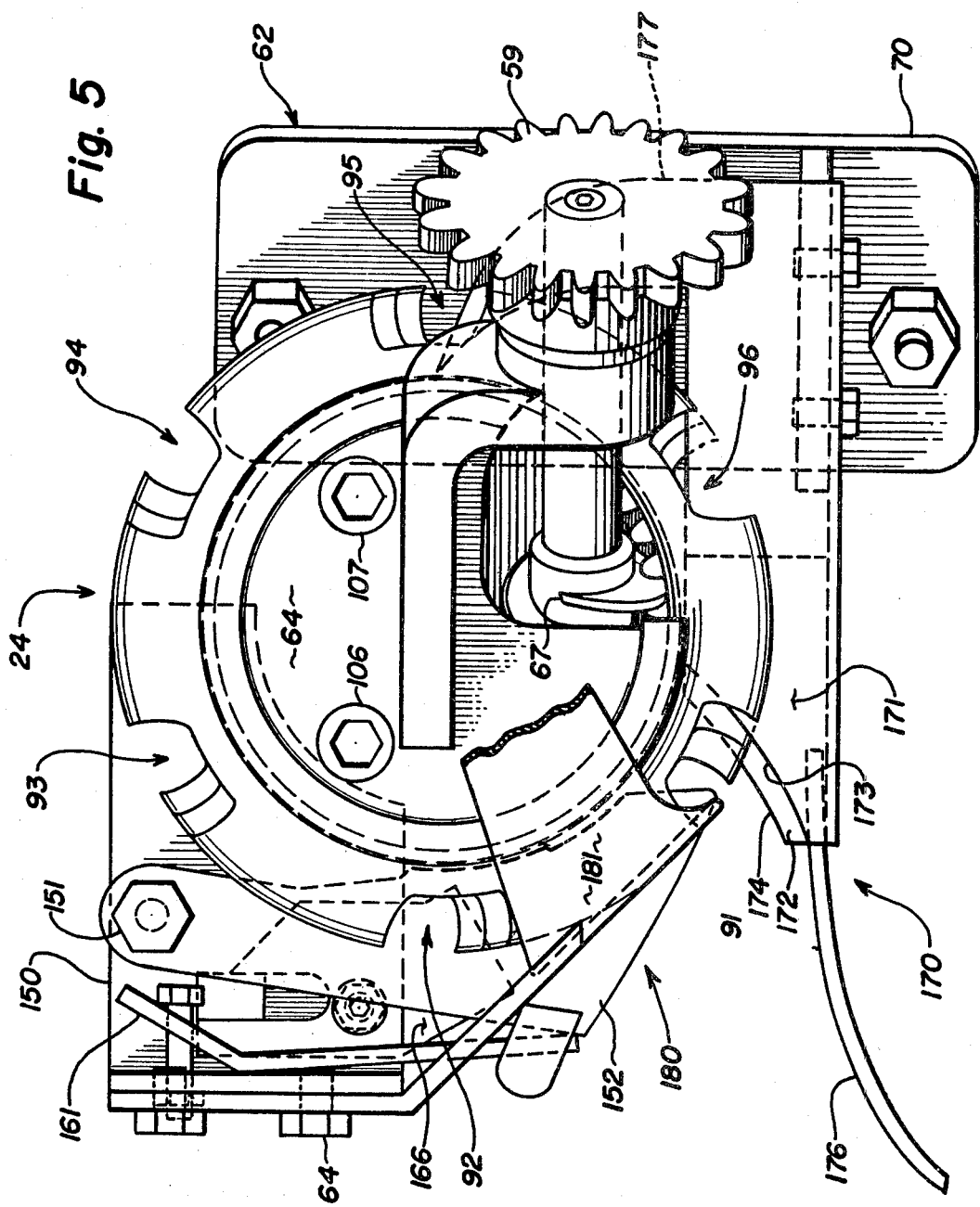
FIG. 5 is a top plan view of the knotter of FIG. 3 taken along lines 5—5 thereof.

Referring now to FIGS. 3, 4 and 5 generally, and 14 and 15 specifically, the twine disc 63 itself comprises a unitary structure with three generally circular flanges or discs 80, 81 and 82 which are laterally spaced one above the other in such a manner as to define respective slots or grooves 83 and 84 (FIG. 15). The flanges 80, 81 and 82 are generally circular in shape and of the same size, and each flange as at its periphery six equispaced notches 86. The notches 86 are generally rectangular in shape and of a depth which is substantially smaller than the difference between the radius of the flanges 80, 81 and 82 and a radius of the central opening 87. Thus, the grooves 83 and 84 still have an effective depth even at the location of the notches 87. The leading and trailing edges 88 and 89, with respect to the direction of rotation 90, of each notch 86 are directed generally radially of the twine flanges 80, 81 and 82 with the outer end of the leading edge 88 cut away to allow the twine readily to enter the notch. Adjacent notches 86 and the three flanges 80, 81 and 82 are slightly offset relative to each other so that the notches 86 in one flange are slightly in advance (with respect to the direction of rotation 90) of the corresponding notches 86 in the flange immediately above. Thus, associated notches 86 in the flanges 80, 81, and 82 define grooves 91 through 96 (FIGS. 5 and 14) which are inclined rearwardly with respect to the direction of rotation 90 at an angle of about 60 degrees relative to the planes of the flanges. All edges of the twine holder flanges 80, 81 and 82 are rounded so as to avoid inadvertent cutting of the twine during operation.

As can be clearly seen in FIGS. 3, 14 and 15, the twine disc 63 is formed with a central opening 87. On the bottom portion thereof, around the interior periphery thereof, are a continuous series of gear teeth 97. These teeth are of uniform size and, as will be seen below, are adapted to intermesh with the worm gear 67 on the billhook shaft. Also, it should be noted in FIG. 15 that the twine disc 63 includes a circular step 99 on the internal portion of flange 80. In the assembled knotter, as seen in FIG. 3, the step 99 is engaged by retainer ring 108 on hub 64 to hold the twine disc 63 in position.

Figure 18:
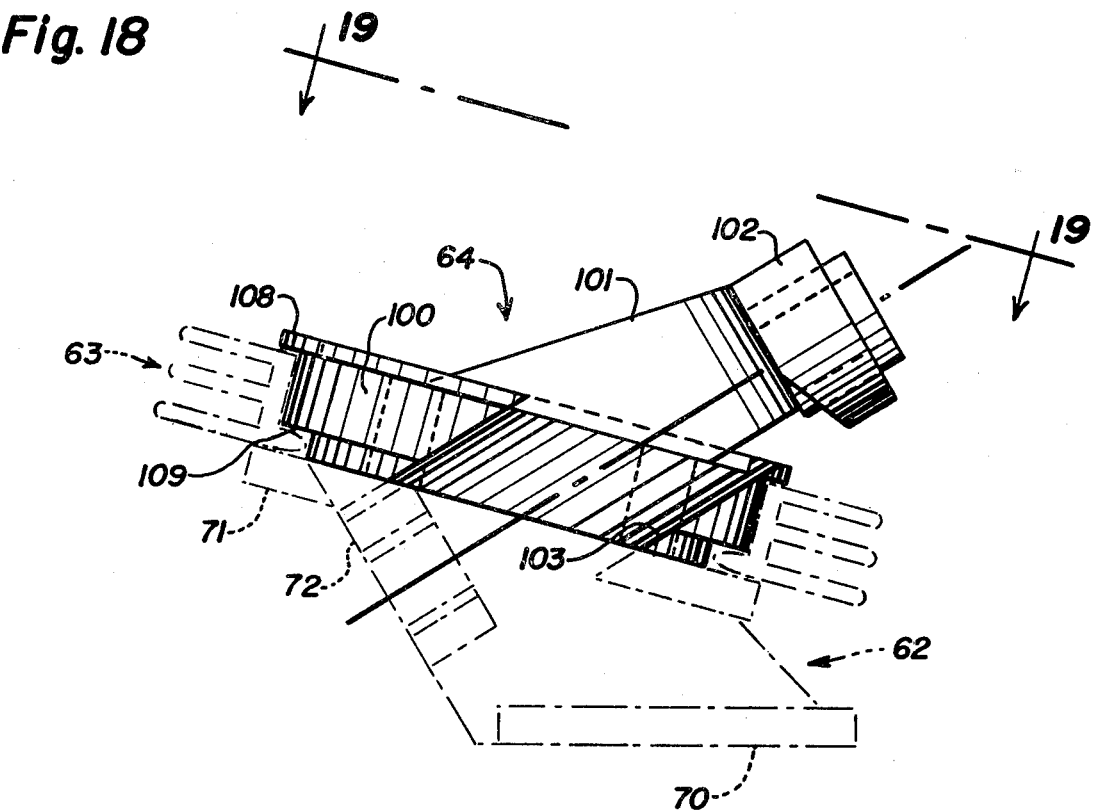
FIG. 18 is a schematic representation of the knotter hub in position relative to the twine disc and support frame.
Figure 19:
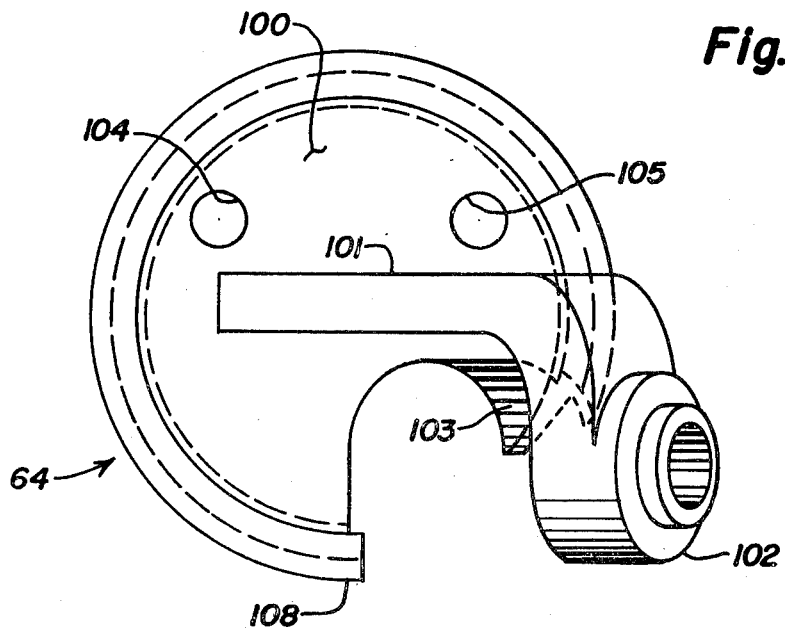
FIG. 19 is a top plan view of the hub, taken along lines 19—19 of FIG. 18.

Attention is now directed generally to FIGS. 3 and 5, and specifically to FIGS. 18 and 19 for a description of the hub 64. A semi-circular block member 100 is formed with an upper substantially annular retaining ring 108 which protrudes beyond the normal periphery of the block member, and a lower substantially annular recess 109 which is of sufficient depth and height to allow clearance for the teeth 97 on the rotatable twine disc 63. A recess slot 103 is formed along one edge of the block member 100 to permit clearance, in the assembled kotter, for the billhook shaft and worm gear. An arm 101 is affixed to the upper surface of the block member and extends angularly away therefrom to support bearing sleeve 102. A brief view of FIG. 3 shows that the relationship between the bearing sleeve 102, bearing sleeve 72 on support frame 62 and the billhook shaft 115 is such that the alignment shown in FIG. 3 is maintained. A pair of orifices 104 and 105 are formed through the block member 100 and are adapted to receive bolts 106 and 107, respectively (see FIGS. 3 and 5), for holding the hub in a fixed position relative to support frame 62. Thus, it can be seen that the hub 64 is affixed solidly to the support frame 62 in such a manner as to prevent the twine disc 63 from undergoing any lateral or vertical movement, yet permitting free rotation thereof.

The knotter further includes a billhook 66 with which is associated a hollow billhook shaft 115 (best seen in FIGS. 3 and 8) rotatably journalled in sleeve sections 116 and 117 of the respective bearing sleeves 72 and 102. The billhook shaft 115 supports at one end the associated driving sprocket 59. The billhook 66 comprises a fixed jaw 118 positioned at about 90 degrees relative to the axis of the billhook shaft 115 opposite to the sprocket 59. The fixed jaw 118 has an elongated body 119 which is wider than it is thick as seen in FIGS. 8 and 9. The transition between the shaft 115 and the jaw body 119 comprises smoothly curved and rounded surfaces 120, thus avoiding any sharp edges which might sever the twine. The fixed jaw 118 has a bent tip portion 121. The transition between the body 119 and the tip portion 121 also comprises smoothly curved and rounded surfaces 122. At the side facing the billhook shaft 115, and adjacent the tip portion 121, the fixed jaw comprises a recess or notch 123 arranged for receiving a crochet hook 124 on movable jaw 126 of the billhook 66 (see FIGS. 10 and 11). At the junction of the fixed jaw 118 and the billhook shaft 115, the fixed jaw is provided with an elongated slot 127 through which the movable jaw 126 extends and in which it is pivotally mounted by a pivot pin 128. The movable jaw 126 has at one end a heel portion 129 which acts as a cam follower with respect to the roller cam 132 (see FIGS. 3 and 4) as the billhook shaft 115 is rotated. The heel portion 129 is generally rectangular as seen in FIG. 11 with its operative, cam follower surface 132 being convex as seen in FIG. 10. The heel portion 129 is smoothly integrated with the remainder of the movable jaw 126.

The movable jaw 126 further comprises a curved portion 133 which serves as a twine guiding surface and which extends from the heel portion 129 to approximately midway along the jaw, i.e., to the point where the movable jaw 126 extends through the slot 127 in the fixed jaw 118. On the side facing the fixed jaw 118, the movable jaw 126 has a transition surface 134 between the curved portion 133 and the crochet hook 124. The crotchet hook 124 on the movable jaw 126 and the notch or recess 123 in the fixed jaw 118 cooperate to grip, and hence maintain, the twine when the latter is positioned between the open jaws and the movable jaw 126 has been moved to its closed position. The movable jaw 126 has a tip portion 136 extending in a similar manner to the tip portion 121 of the fixed jaw 118. Furthermore, the central portion of the jaw 126 includes, on the opposite side to the fixed jaw 118, a shoulder 137 for preventing the entrapment of a section of twine between the movable jaw 126 and the slot 127 through a central portion of the fixed jaw 118 which would interfere with the proper operation of the billhook 66 in tying a knot, or prevent the release of a tied knot from the billhook.

The movable jaw 126 further includes a recess or notch, 138 in the opposite side to the fixed jaw 118 at a location slightly offset relative to the pivot 128. A mechanism for spring loading the movable jaw 126 is provided inside the hollow billhook shaft 115 whereby the jaw is urged to the closed position. Referring to FIG. 3, the mechanism comprises an adjustable screw-threaded stop member 141, a compression spring 142 abutting at one end the adjustable stop member 141 and at the other end an abutment member 143 engaging a retainer pin 144. The retainer pin 144 comprises an elongate stem 146 extending coaxially with the billhook shaft 115 and an angled end 147 adapted for engagement with the notch or recess 138 in the movable jaw 126.

The billhook shaft 115 carries intermediate the sleeve sections 116 and 117 a worm gear 67 with a single spiral tooth for driving the twine disc 63. Bearing sleeves 72 and 102 are so arranged as to maintain the worm gear 67 in driving engagement with teeth 97 on the internal periphery of twine disc 63. With the worm gear fixed in position on shaft 115, it can be seen that rotation of sprocket 59 causes a fixed rotational response in the twine disc 63. The fixed transmission ratio between the billhook shaft 115 and the twine disc 63 is 12/1 and the various components are arranged so that the shaft and discs rotate in the same direction.

As best seen in FIGS. 3, 4 and 5, a further support member 150 is provided on base 62 with a pivot 151 at one side of the twine disc 63 for pivotally mounting a pair of twine retaining fingers 152 and 153, which are integrally connected at one end. The twine finger mechanism is shown in detail in FIGS. 12 and 13. The fingers 152 and 153 extend from the pivot 151 in a transverse direction across the twine disc 63 and extend in part into the grooves 83 and 84, respectively. Each finger 152 and 153 has a curved edge 154 opposite the pivot which edge acts as a twine guide, assisting in the positioning of the secondary portion 43 of the twine in the groove 91 as seen in FIG. 5. The edge 154 partly defines a generally hooked end 156 of the finger which, at least in the upper finger 152, as shown in FIGS. 12 and 13, has a straight edge 157 which also acts as a twine guide. The edges of the fingers 152 and 153 facing towards twine disc 63 and extending between the flanges thereof each comprise a flat section 158 and a curved section 159, separated by a curved section 160 of a smaller radius than section 159. The fingers 152 and 153 are resiliently urged into grooves 83 and 84 by a leaf spring 161 (see FIGS. 3, 4, and 5). The leaf spring 161 is secured at one end adjacent the pivot 151 to the upturned edge of support member 150 and extends in the direction of the fingers and contacts the same between ears 162 and 163 adjacent edge 154 of the twine fingers. An adjustable screw 164 (see FIG. 5), mounted on support member 150, contacts leaf spring 161 intermediate its ends to provide adjustment of the pressure exerted by the spring on the fingers 152 and 153.

Projecting from support member 150 in a rearward direction and closely adjacent the underside of flange 82 of twine disc 63 is a knife blade 166 (best seen in FIGS. 3, 5 and 16) having a cutting edge facing in a direction opposite to the direction of rotation 90 of the twine disc 63. The knife blade 166 is adjustably and releasably mounted to facilitate adjustment and either sharpening or replacement should this become necessary.

A first stationary twine guide 170 (see FIGS. 4 and 5) is affixed to support frame 62 adjacent a side of the twine disc 63. Twine guide 170 includes a pair of parallel spaced apart plates 171 and 172 which extend partially into the grooves 83 and 84, respectively, of twine disc 63 and terminate forwardly in guide edges 173 and 174. A curved guide extension 176 is affixed to the twine guide 170 and directed forwardly and away from the knotter mechanism. Guide extension 176 and guide edges 173 and 174 cooperate to direct twine inwardly toward a twine gripping area, best seen in FIG. 5, defined by groove 91 and the twine retaining fingers 152 and 153. Guide 170 terminates rearwardly in a pair of spaced apart twine disc cleaners 177 and 178 which extend into the grooves 83 and 84 respectively to remove any material therein and direct it away from the knot tying mechanism.

Projecting from the upturned edge of support member 150 in a rearwardly direction partially above the twine disc 63 is a second stationary twine guide 180. This second twine guide 180 comprises a guide surface 181 operable to guide twine towards the twine gripping area of groove 91.

Having thus described the components of the knotter constructed in accordance with the invention, the operation thereof will now be described in greater detail with reference to FIGS. 20 through 31. The sequence of operation of the mechanism will be described with reference to FIG. 31 illustrating the various characterizing angular positions of main shaft 30.

During operation, the baler is moved across a field and crop material, such as hay, to be baled is picked up from the ground with the pickup mechanism 11 and is delivered thereby to the feeder mechanism 12 which in turn feeds the crop material in successive batches or charges into the bale chamber 13 in timed sequence with the reciprocating baler plunger 16. The plunger 16 compresses the crop material into a bale 14 and at the same time gradually advances the bale towards the outlet 17 of the baling chamber in the direction of arrow 18. As long as the clutch mechanism 37 is not actuated, all components of the knotters 24 are in their rest position. This means that needles 23 are in their lowermost dwell position as shown in full lines in FIG. 2, while the billhook 66 projects downwardly as seen in FIG. 4. As already mentioned, a primary portion 20 of twine 21 extends from a supply reel 22 across the bale chamber 13 in the path of the leading end of the bale 14 being formed and passes through the eye of the needle 23, with the free end of the primary portion being supported in the twine disc 63 of the associated knotter 23, bearing in mind that the two knotters are employed, whereby each bale 14 is bound by two pieces of twine.

The free end of the primary portion of the twine 21 is received in a groove 92 of the twine disc 63 and passes across the top of the twine disc 63 and down into the next groove 91 (arising from the knotting operation in relation to the previous bale) and is firmly held in position by the retainer fingers 152 and 153 in cooperation with the flanges 80, 81 and 82.

As a bale 14 is being formed and moved along the bale chamber 13, the star wheel 33 is rotated thereby and as the bale reaches a predetermined length, the metering wheel 33 actuates the clutch mechanism 37, whereupon the main shaft 30 is rotated through 360 degrees by the chain and sprocket drive mechanism. During the first 180 degrees of rotation of the shaft 30 (referenced by number 186 in FIG. 31) the crank arm 39, the pitman 40 and the needle frame 41 are pivoted whereby the needles 23 move from their lowermost rest position, when the main shaft 30 is at point 187 in FIG. 31, to their highest, full throw, positions (phantom lines in FIG. 2) when the main shaft 30 is at reference 188. Simultaneously, as is known in the art, the baler plunger 16 is moving towards its extreme material compressing position. The needles 23 move upwardly through the baling chamber 13 and through slots (not shown) in the face of the plunger 16, whereby the plunger holds the crop material to be baled away from the needles 23 but enabling a smooth and unobstructed passage of the needles 23 through the bale chamber 13 and preventing bending and/or breakage of the needles 23. During the next 180 degrees of rotation (referenced 189 in FIG. 31) of the main shaft 30, the needles 23 are retracted and returned to their rest or dwell positions at reference 187 of the main shaft 30. At the same time, the plunger 16 is retracted. During the initial movement (reference 190 in FIG. 31) over 120 degrees of the main shaft 30 feed teeth 51 of the gear segment 50 are not in mesh with the teeth of the conical gear 52, whereby the actual knotting mechanism is not operated.

During the initial movement 190 of the shaft 30, each needle 23 carries the end of the secondary twine portion 43 of the twine 21 from the position shown in full lines in FIG. 2 around the bottom and trailing end of the bale 14 to the position shown in phantom lines in FIG. 2. At the position 191 of the main shaft 30, the tip of each needle 23 projects through the aperture 60 in the bale chamber top wall and at a location generally forwardly of the associated knotter 24 and slightly offset to the left relative to the billhook 66 thereof and relative to the center of the twine disc 63. At that moment, the needle 23 places the end of the secondary twine portion 43 in the groove 91 positioned above and slightly rearwardly of the billhook 66 and adjacent the primary end portion 20 already positioned therein. At that moment, the secondary twine portion 43 is substantially perpendicular to the plane of the twine disc 63 within groove 91 at the apex of the V defined by the stationary guide members 170 and 180. Hence, the twine portion 43 is readily located in the groove 91. The end of the secondary twine portion 43 is held against the trailing edge 89 of the notches 86 while the end of the primary portion 20 is held against the leading edge 88 thereof. The guide edge 181 of stationary guide 180, guide extension 176 and guide edges 173 and 174 of stationary guide 170, and edges 154 of twine retainer fingers 152 and 153 thus cooperate with the edges of the twine disc flanges 80, 81 and 82 in guiding the end of the secondary twine portion 43 into the appropriate position in groove 91.

Gear segment 50 meshes with the conical gear 52 at the position 191 of the main shaft 30, whereby the billhook shaft 115 and the twine disc 63 start rotating in the proper direction. The transmission ratios are such that for a 60 degree rotation of the main shaft 30, the billhook shaft 115 is rotated through 360 degrees and the twine disc 63 is rotated through only 30 degrees.

As the twine disc 63 is rotated over said 30 degrees in the direction 90, the ends of the primary and secondary twine portions 20 and 43 held in the groove 91 are caused to move in the same direction and towards the twine retainer fingers 152 and 153. The guide edges 157 on the twine retainer fingers wedge the twine portions between said fingers and the flanges 80, 81 and 82. After no more than 15 degrees of rotation of the twine disc 63, the end of the twine portions 20 and 43 are strongly caught and held between the fingers and the flanges and only can slide therebetween under a substantial load. This firm grasp on the two portions of twine is held over about 30 degrees of rotation of the twine disc 63, i.e., until the main shaft 30 has reached the position 192. Thereafter, the ends of the twine portions 20 and 43 are moved between the sections 160 of the retainer fingers and the flanges which increases the area of contact between the various components and the twine so that the grasp on these ends is further increased to the extent that the ends can no longer slide between the components. The free end of the primary twine portion 20, which initially was held between the flanges and the sections 160 on the twine fingers, moves past the sections 160 substantially at the same moment as the ends of the twine portions 20 and 43 moved between the flanges and the twine retainer fingers at the location of the hooked ends 156 of the fingers.

As the twine holder 63 is rotated over the first 30 degrees of its movement, i.e., when the main shaft 30 is rotated from the position 191 to the position 188, the billhook shaft 115 is rotated over a first full cycle of 360 degrees. The primary twine portion 20 extends, as shown in FIG. 3, between the groove 91 and the twine retaining edge or roller 61 of the aperture 60 and the bale chamber top wall when the main shaft 30 is in the position 191. At the same time, the secondary twine portion 43 extends between the same groove 91 and a further forwardly positioned lower point, which normally is defined by the trailing end of the bale of crop material in the bale chamber 13. Thus, both twine portions 20 and 43 normally have a slightly different position when the main shaft is in the position 191.

During the first 90 degree rotation of the billhook shaft 115, the billhook 66 engages both twine portions 20 and 43 from below and from the right (FIG. 20) and causes them to slide from the tip 121 of the fixed jaw 118 towards the base thereof over the forward surface 196 (FIG. 21), thus the twine portions are urged to move in front of the billhook 66.

Figure 22:
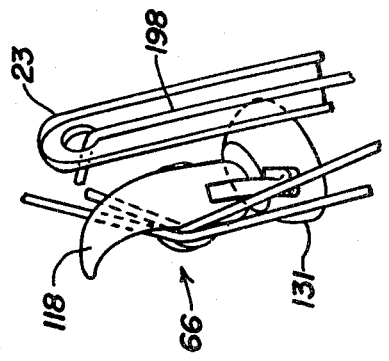

During the next 90 degree rotation of the billhook shaft 115 (90–180 degree movement), the twine portions 20 and 43 slide further towards and arrive at, the base or heel of the billhook 66 so that said strands are now positioned rearwardly of the billhook 66 and engage the rear edge 197 of the movable jaw 126 (FIG. 22). The twine portions 20 and 43 are maintained behind the billhook 66 during its movement from the 90 degree position to the 180 degree position by the notches 86 forming the groove 91 in which the portions are located which are still positioned rearwardly of the billhook, thus holding the twine portions 20 and 43 in a substantially rearwardly and upwardly inclined position and at an angle relative to the billhook 66. The heel portion 132 of the movable jaw 126 engages the roller cam 131 during the latter part of the rotational movement of the billhook shaft 115 from the 90 degree to the 180 degree position. This causes the movable jaw 126 to open against the resilient force of the spring 142 but this does not result in the ends of the twine portions 20 and 43 being caught between the jaws as is usual at this stage in conventional knotters. This is because the upper parts of the twine portions 20 and 43 are positioned rearwardly of the opened jaw 126 as already explained. The opening of jaws 118 and 126 at this stage does serve a useful purpose, however, in that the movable jaw 126 positively urges the upper parts of the said twine portions into the relative groove 91 which is now positioned adjacent the billhook 66 and towards the base thereof. This is especially so during the continued movement of the billhook 66 beyond the 180 degree position. Thus, during the first cycle the billhook 66 positively assists in properly positioning the twine portions 20 and 43 relative to the twine disc 63 by positioning them about the billhook so that they can be held in the disc in a desired manner.

Figure 24:
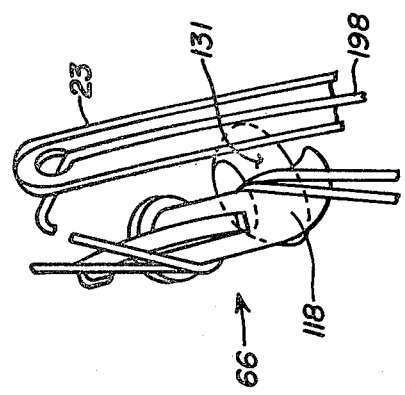
Figure 23:
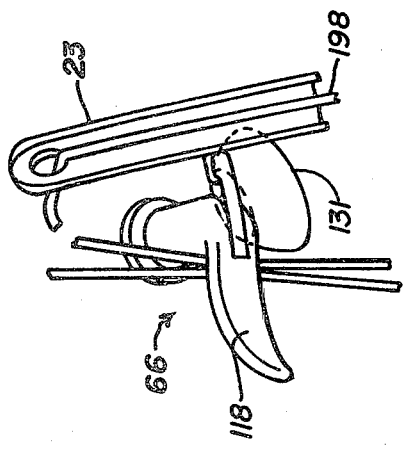

Continued rotation of the billhook shaft 115 from the 180 degree position to the 270 degree position causes both twine portions 20 and 43 to slide over the rear edge 197 of the movable jaw 126 in the direction of the pivot pin 128 and the shoulder 137 (FIGS. 10 and 23). Both twine portions 20 and 43 are now held behind the billhook 66 at the right-hand side thereof. Simultaneously, the movable jaw 126 is again closed under the resilient pressure of spring 142 as soon as the heel portion 132 disengages the roller cam 131. Continued rotation of the billhook shaft 115 from the 270 degree position to the 360 degree position causes the twine portions 20 and 43 further to slide along the billhook 66 so as to engage the shoulder 137 of the movable jaw 126 (FIG. 24). Thus, on completion of the first cycle (360 degrees) of the billhook 66 both twine portions 20 and 43 extend from above the billhook along the right-hand side of the base thereof, behind the rear edge 197 of the movable jaw 126, and over the leading edge of surface 119 of the fixed jaw 118. The lower strands portions project in a forwardly inclined direction over the respective tip portions 121 and 136 of the jaws 118 and 126. This enables the billhook 66, upon continued rotation beyond the 360 degree position, (i.e. during its second cycle) to catch again both twine portions 20 and 43 from below and from the rear thereof as seen in FIG. 24.

The billhook 66 is thus operated during its first full cycle of 360 degrees (movement of the main shaft 30 from the position 191 to the position 188) to bring the twine portions 20 and 43 closely parallel and adjacent to each other so that they are in the best possible condition for a knot to be tied during the next cycle of the billhook 66. At the end of the first cycle of the billhook 66, each needle 23 has reached its full throw position and is at the point of returning to its fully retracted or dwell position. The needles 23 reach their dwell position when the main shaft 30 returns to its position 187. During this movement, each needle 23 carries a further portion of twine 198 down the trailing end of the formed bale and this twine portion 198 becomes the primary twine portion for the next bale to be formed.

When the main shaft 30 has reached the position 199, the gear segment 50 passes beyond the conical gear 52, whereby drive to the knotters 24 is interrupted. Thus, further rotation of the main shaft 30 from the position 199 to the position 187 merely completes the retraction of the needles 23 to their dwell positions.

Figure 25:
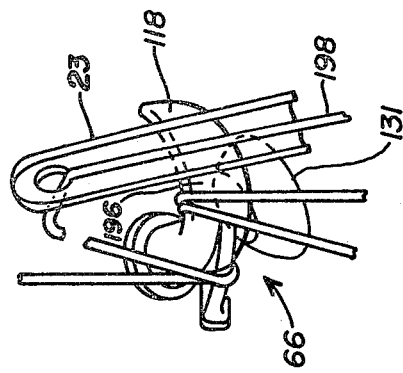
Figure 21:
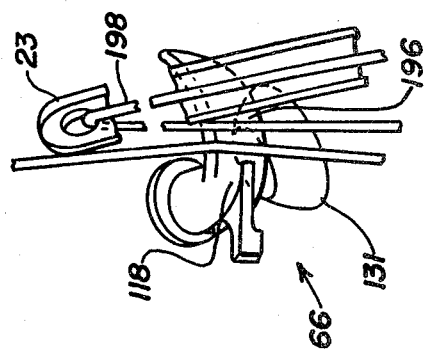

As the main shaft 30 moves from the position 188 to the position 192 the billhook shaft 115 is rotated over the first 180 degrees of its second cycle (the actual knotting cycle). During the first 90 degrees of this cycle the tips 121 and 136 of the billhook jaws hook behind and below the twine portions 20 and 43 from the right hand side and the latter begins to slide over the surface 196 of the fixed jaw 118. (FIG. 25). Further rotation of the billhook 66 from the 90 degree position to the 180 degree position of the second cycle causes the lower parts of the twine portions 20 and 43 to slide further over the surface 196 of the fixed jaw 118 towards the base thereof (FIG. 26). Simultaneously, the heel 129 of the movable jaw 126 hooks behind the upper parts of the twine portions 20 and 43 thus causing them to slide in the direction of the base of the billhook 66 over the curved section 133 of the movable jaw 126. Continued rotation of the billhook shaft 115 toward the 180 degree position results in a loop being formed around the billhook 66 (FIG. 26). As the loop is being completed, the heel 129 contacts the roller cam 131 for the second time which opens the jaws 118 and 126 and the twine portions 20 and 43 are now in a position relative to the billhook 66 in which they can enter the open jaws as seen in FIG. 29. This is because the groove 91 holding the twine portions has now reached a position closer to the billhook and slightly to the right thereof. At the same time, the groove 92 reaches a position in which the end of the primary twine portion 20 previously held thereby is released.

As the heel 129 moves off the roller cam 131 during movement of the billhook shaft 115 from the 180 degree position to the 270 degree position, the jaw 126 is closed due to the action of the spring 142, whereupon the twine portions 20 and 43 are firmly clamped in the billhook jaws 118 and 126 (FIGS. 27 and 30).

During the loop-forming part of the cycle a substantial tensile force is exerted on the twine portions 20 and 43 causing them gradually to slip a limited amount between the flanges 80, 81 and 82 and the associated twine retaining fingers 152 and 153. This is necessary in order to provide a certain length of twine with which to form a knot, the appropriate length being determined by the curvature of the surface 133 of the movable jaw 126 and being sufficient not only to enable the knot to be tied but also for the knot to be loose enough (but not too loose) for it to be pulled from the billhook. This length of twine is longer than on conventional knotters.

During the movement of the main shaft 30 from the position 192 to the position 199, the billhook 66 is rotated from its 180 degree position to its 360 degree position of the second cycle during which movement the loop of twine slides towards the tip of the billhook 66 with the ends of the twine portions 20 and 43 still clamped between the jaws 118 and 126. Also, the twine disc 63 is rotated further, thereby moving the ends of the twine portions to the sections 160 of the retainer fingers 152 and 153 so that, as explained, the grasp on the twine portions is increased substantially to the extent that the ends are no longer allowed to slide in between the various components even under an increased tensile load. As the twine disc 63 moves on its next following rest position (which is reached with the main shaft 30 in position 199), the groove 91 holding the twine portions 20 and 43 moves past the fixed knife blade 166, whereby both portions of twine are severed, leaving the formed bale 14 independent as such although the looped ends of the twine portions are still retained on the billhook 66 (FIG. 28). The cutting of the primary twine portion 20 gives rise to a short piece of twine and if this does not fall from between the discs 80, 81 and 82 during the formation of the subsequent bales, the twine disc cleaners 177 and 178 will remove it. A clean cut of twine portions 20 and 43 is obtained as at the moment of cutting, these portions are firmly held in the twine disc 63 by the finger sections 160 as described above.

Figure 32:
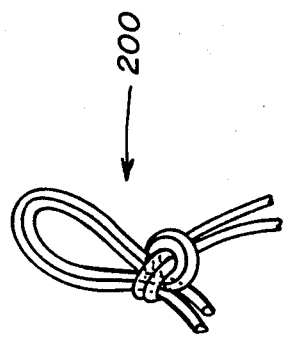
FIG. 32 shows schematically a knot formed with the knotter of the instant invention.

The billhook 66 thus moves to its rest position in timed sequence with the tail ends of the twine portions 20 and 43 being cut. In this position, the jaws 118 and 126 extend generally downwardly and rearwardly toward and adjacent, or even partially through, the aperture 60 in the top wall of the bale chamber 13. As stated, the loop just formed is still retained in the billhook 66 with the severed tail ends still clamped therebetween. The tail ends are more or less firmly clamped between the jaws 118 and 126 under the action of the spring 142, with the crochet hook 124 of the movable jaw 126 resting in the notch 123 of the fixed jaw 118. The subsequent strokes of the bale plunger 16 cause the wrapped bale 14 to move further rearwardly along the bale chamber 13, thereby also causing the loop to be pulled off the billhook 66 over the severed tail ends of the twine portions 20 and 43 and to tighten the loop around the tail ends. At this moment the knot is actually completed. The tail ends of the twine portions 20 and 43 are finally also released under the increasing tensile load exerted thereupon by the rearward movement of the bale in the chamber 13. Depending upon the shape, dimensions and adjustment of the billhook 66, as is generally known in the art, the knot so formed will be an overhand knot or bow knot the latter being illustrated in FIG. 32, as reference number 200.

As the main shaft 30 approaches the position 199, the tail end 198 of the primary twine portion for the next bale, which is held in the next following groove 96 and which extends over the the top of the twine disc 63, engages the section 160 of the fingers 152 and 153, so that when a tensile load is exerted on the twine during the formation of the following bale, said tail end is firmly held and does not slip.

At the same time that the twine disc 63 reaches its rest position, the next following groove 96 is brought into position at the apex of the V formed by the twine guide 170 and 181 for receiving the primary twine portion 198 of the next bale of which portion is held in the groove 91 and extends over the uppermost flange 80, down through the groove 96 to the needle 23 and then to reel 22, a guide surface 181 of the twine guide 180 and the guide edge 172 and 174 of the twine guide 170 assisting in the positioning of the twine portion 198.

In typical prior art knotters a twine finger is required to place the twine in the correct position to engage the billhook and a stripping finger or the like is required to pull the cut twine ends off the billhook jaws. With the present invention, however, the twine finger and twine stripper and drive means therefor are not necessary due to the particular arrangement of the twine holder relative to the billhook and due to the fact that the billhook has a twine "assembling" cycle (the first cycle) in addition to a knotting cycle. Furthermore, the normal movable knife blade for cutting twine after a knot has been tied, has been replaced by a simple stationary knife with the relative movement required for the cutting operation being provided by the rotation of the twine holder. This further simplifies the structure.

Figure 20:
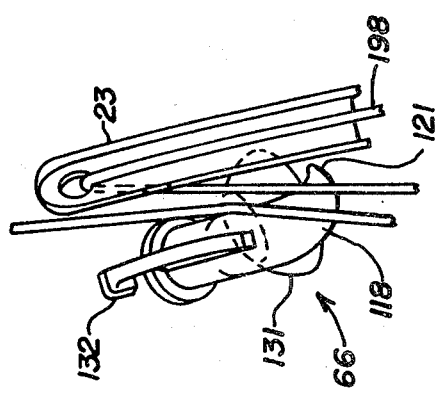

It will be seen that the cam roller 131 is relatively large and as it is contacted by the heel 129 of the movable jaw 126 over a small angular part of each cycle of movement of the billhook 66, the rotational movement of the roller is also small, wear is equally spread over the roller surface, thus minimizing surface deterioration. The location of the roller 131 relative to the billhook 66 is such that it does not present a trap for the twine portions 20 and 43 as it would if it were positioned on a heel of the movable jaw 126 as in known knotters. FIGS. 20 and 24 show that the twine portions 20 and 43 are substantially parallel to the billhook jaws at the start of the cycle of the billhook. FIG. 26 shows that the loop formed in the twine portions 20 and 43 is substantially at right angles to the position of these portions at the start of the cycle, whereby the twine portions have to move over a relatively large distance between these positions and the length of the curved section 133 of the movable jaw reflects this, the length being three to four times greater than known billhooks.

From the foregoing it will be understood by those skilleed in the art that a knotter according to the instant invention is a simple design, whereby it is simple to manufacture, assemble, and adjust. The structure is very reliable and requires only a minimum of attention once it has left the factory. Field adjustments, if required at all, are readily accomplished and can be made by the average operator whereby extensive harvesting delays are avoided. Variations in twine and the use of different types of twine only require minimum adjustments, if any at all. The number of oscillating and complicated parts and of complicated drive means such as cams and cam followers, has been reduced to minimum and most of the moving parts have rotational movement only. The remaining oscillator components are small in size and have only small displacement. For this and other reasons, the inertia forces are less critical and hence the speed of operation of the knotter, and hence the baler, can be increased substantially. Increased knotter speed does not adversely affect the quality of the knot tied by the knotter because, as described, an entire cycle of operation is devoted to establishing the proper position of the portions of twine to be tied and a further entire cycle is devoted to tying the actual knot. In most known balers, the maximum baling speed is 90 strokes per minute of the bale plunger but upwards of 130 strokes per minute can be accommodated by a knotter in accordance with the present invention. Within reason, the plunger speed of operation is unlimited and the only restraint is that imposed by the knotter which normally only has one cycle of 360 degrees in which to perform the knotting operation and which is completed in between two subsequent plunger strokes so that the speed of the moving parts is high so that inertia and other factors become significant and detract from the consistent tying of acceptable knots.

Conventional knotters normally have a main drive arrangement for each knotter installed on the baler. As the baler usually employs two knotters, then two main drive means are required. However, two or more knotters according to the present invention can be driven by a simple, single main drive arrangement.

Due to the simple design and the reduced number of moving parts, it is possible to significantly reduce the number of greasing nipples per knotter. Conventional knotters normally have six or seven greasing nipples, but a knotter according to the present invention requires only one or two. Also, due to the design of the knotter, the operation of the knotting mechanism will be affected to a lesser extent, if at all, by the vibrations of the baler, the tension in the twine, the jarring of the baler as it moves through a field, variation in the crop conditions such as tough or resilient crop causing the baler twine to jump about, and moisture, dirt, crop debris and the like, all subjecting the components to abrasion.

The angle of the billhook shaft relative to the bale chamber is advantageous for the reason that the billhook is positioned extremely close to the bale. Thus, a shorter loop of twine around the bale and thus also a higher bale density is obtained in that the bale is found tighter and does not expand to take up slack in the twine band. The chosen inclination of the billhook shaft, and also the billhook, relative to the bale chamber is also advantageous in that the load on the twine as the knot is pulled off the bale hook is reduced.

By extending the billhook shaft 115 through the twine disc 63 an important breakthrough in efficiency has been attained. It is thereby possible to incline the twine disc relative to the top of the bale case while maintaining the proper billhook attitude. The twine disc 63 is located very nearly perpendicular to the twine path provided by movement of needles 23, thus providing a larger contact area between the twine and the disc grooves, and a decrease in misties due to gripping failures. In the embodiment shown, the twine disc angle, $\theta_1$, is advantageously about 15 degrees. The angle between the billhook shaft 115 and the twine disc 63, $\theta_2$, is chosen to be about 45 degrees also. Of course, these angles may vary; however, the figures given represent the optimum arrangement now known.

Finally, it will be also understood by those skilled in the art that the cost of a knotter according to the invention and the cost of the field delays and servicing are reduced substantially in comparison with costs of a conventional knotter.

While a specific embodiment of the invention has been illustrated and described, it will be apparent to those skilled in the art that various alterations and modifications in the construction and arrangement of components can be made.

Having thus described the invention, what is claimed is:

1. In a crop baling machine having an elongate bale case, a pickup and infeed mechanism for delivering crop material into said bale case, a packing mechanism at least partially within said bale case for compressing the crop material therein into a compact mass and forcing it through said bale case, a twine dispensing mechanism including at least one twine carrying needle movable through said bale case, and a knot tying mechanism on said bale case for cyclically receiving twine from said needle and tying a knot in primary and secondary portions thereof to provide separate discrete packages of crop material, said knot typing mechanism including a support frame, means mounted on said frame for holding the primary and secondary portions of twine in a substantially side-by-side relationship extending along a predetermined path, said means for holding including a washer-like twine disc rotatably held on said frame by a hub fixed to said frame, said path movable with the rotation of said twine disc between at least first and second positions, a billhook including a elongate shaft, said shaft extending angularly through and rotatable relative to said hub, said billhook positioned to intersect said predetermined path so that during a first cycle said billhook engages the twine portions at said first location and repositions the primary and secondary portions of twine thereabout, and during a second cycle said billhook grips said twine portions at said second position and forms a knot therein, and means for rotating said twine disc and said billhook in timed relation, the improvement in said knot typing mechanism wherein:
said means for rotating comprises a worm gear axially fixed to said shaft, and a plurality of gear teeth fixed to the inner periphery of said washer-like twine disc, said gear teeth intermeshing with said worm gear such that rotation of said shaft causes a corresponding rotation of said twine disc.

2. The machine of claim 1, wherein:
said twine disc comprises a plurality of spaced, interconnected coaxial washer-like discs arranged in a generally vertical stack, each disc having a plurality of notches equally spaced around the periphery thereof, said discs further being offset relative to each other so that the notches of one disc lead, in the direction of rotation, the notches in the disc immediately above, whereby adjacent notches in the respective discs define a plurality of inclined grooves around the outer periphery of the twine disc.

3. The machine of claim 2, wherein:
said shaft forms an angle of approximately 45° with a perpendicular plane through the axis of rotation of said twine disc.

4. The machine of claim 3, wherein said means for holding further includes:
a plurality of twine retainer fingers fixed to said support frame and extending into the spaces between said plurality of discs, one finger into each space, to cooperate with said discs to grip and hold the primary and secondary portions of twine.

5. In an apparatus for tying knots in a primary portion and a secondary portion of twine, the apparatus including a support frame, means for holding the primary and secondary portions of twine in a substantially side-by-side relationship extending along a predetermined path including a washer-like twine disc with an axial opening therethrough, a hub extending through said axial opening in said twine disc fixed to said frame and rotatably holding said twine disc relative thereto, said path movable with the rotation of said twine disc between at least first and second positions, a billhook including an elongate shaft with a longitudinal axis rotatably mounted on said frame and extending angularly through said hub, said billhook positioned to intersect said predetermined path so that during a first cycle said billhook engages the twine portions at said first position and repositions the primary and secondary portions of twine thereabout, and during a second cycle said billhook grips said twine portions at said second position and forms a knot therein, and means for rotating said twine disc and said billhook in timed relation, the improvement wherein:
said means for rotating comprises a worm gear axially fixed to said shaft, and a plurality of gear teeth fixed to the inner periphery of said axial opening cooperatively engaging said worm gear whereby rotation of said shaft produces a corresponding rotation of said twine disc.

6. The apparatus of claim 5, wherein:

said twine disc comprises a plurality of spaced, interconnected coaxial washer-like discs arranged in a generally vertical stack, each disc having a plurality of notches equally spaced around the periphery thereof, said discs further being offset relative to each other so that the notches of one disc lead, in the direction of rotation, the notches in the disc immediately above, whereby adjacent notches in the respective discs define a pluraltiy of inclined grooves around the outer periphery of the twine disc.

7. The apparatus of claim 6, wherein:

said shaft forms an angle of approximately 45° with a perpendicular plane through the axis of rotation of said twine disc.

8. The apparatus of claim 7, wheren said means for holding further includes:

a plurality of twine retainer fingers fixed to said support frame and extending into the spaces between said plurality of discs, one finger into each space, to cooperate with said discs to grip and hold the primary and secondary portions of twine.

9. The apparatus of claim 8, further including:

a bracket affixed to said hub rotatably supporting one portion of said shafts.

10. In a knotter for a crop baling machine including a support frame, a washer-like twine disc with an axial opening, a hub extending through said axial opening in said twine disc fixed to said frame and rotatably holding said twine disc relative thereto, a billhook including an elongate shaft, said shaft extending angularly through said hub, and means to rotate said shaft and said twine disc in timed relation, the improvement wherein:

said means for rotating comprises a worm gear axially fixed to said shaft, and a plurality of gear teeth fixed to the inner periphery of said axial opening cooperatively engaging said worm gear whereby rotation of said shaft produces a corresponding rotation of said twine disc.

11. The knotter of claim 10, wherein:

said twine disc comprises a plurality of spaced, interconnected coaxial washer-like discs arranged in a generally vertical stack, each disc having a plurality of notches equally spaced around the periphery thereof, said discs further being offset relative to each other so that the notches of one disc lead, in the direction of rotation, the notches in the disc immediately above, whereby adjacent notches in the respective discs define a plurality of inclined grooves around the outer periphery of the twine disc.

12. The knotter of claim 11, wherein:

said shaft forms an angle of approximately 45° with a perpendicular plane through the axis of rotation of said twine disc.

13. The knotter of claim 12, further including:

a plurality of twine retainer fingers fixed to said support frame and extending into the spaces between said plurality of discs, one finger into each space, to cooperate with said discs to grip and hold the primary and secondary portions of twine.

14. The knotter of claim 13, further including:

a bracket affixed to said hub rotatably supporting one portion of said shafts.

* * * * *